United States Patent
Naohara et al.

(10) Patent No.: US 11,274,995 B2
(45) Date of Patent: Mar. 15, 2022

(54) DATA PROCESSING METHOD, DATA PROCESSING DEVICE, AND COMPUTER-READABLE RECORDING MEDIUM HAVING RECORDED THEREON DATA PROCESSING PROGRAM

(71) Applicant: SCREEN Holdings Co., Ltd., Kyoto (JP)

(72) Inventors: Hideji Naohara, Kyoto (JP); Masashi Akita, Kyoto (JP)

(73) Assignee: SCREEN Holdings Co., Ltd.

( * ) Notice: Subject to any disclaimer, the term of this patent is extended or adjusted under 35 U.S.C. 154(b) by 347 days.

(21) Appl. No.: 16/261,654

(22) Filed: Jan. 30, 2019

(65) Prior Publication Data
US 2019/0242788 A1  Aug. 8, 2019

(30) Foreign Application Priority Data
Feb. 8, 2018 (JE) .............................. JP2018-020797

(51) Int. Cl.
G01M 99/00 (2011.01)

(52) U.S. Cl.
CPC .................................. G01M 99/00 (2013.01)

(58) Field of Classification Search
CPC ................................................... G01M 99/00
USPC ........................................................ 702/183
See application file for complete search history.

(56) References Cited

U.S. PATENT DOCUMENTS

| | | | |
|---|---|---|---|
| 7,200,523 B1 | 4/2007 | Yeh et al. | 702/182 |
| 2007/0162172 A1* | 7/2007 | Tanaka | G05B 21/02 700/108 |
| 2008/0040061 A1 | 2/2008 | Osada | 702/82 |
| 2008/0183778 A1* | 7/2008 | Neogi | G06F 16/22 |
| 2009/0014725 A1 | 1/2009 | Nakanishi | 257/66 |
| 2009/0228408 A1 | 9/2009 | Kaushal et al. | |
| 2010/0015889 A1 | 1/2010 | Shimizu et al. | 451/5 |
| 2011/0219327 A1* | 9/2011 | Middleton, Jr. | G05B 23/0272 715/772 |
| 2011/0288835 A1 | 11/2011 | Hasuo et al. | 703/2 |
| 2013/0132480 A1 | 5/2013 | Tsuji et al. | 709/204 |
| 2013/0152412 A1* | 6/2013 | Kumagai | G01C 15/002 33/291 |
| 2013/0218522 A1 | 8/2013 | Suzuki et al. | 702/183 |

(Continued)

FOREIGN PATENT DOCUMENTS

| | | |
|---|---|---|
| CN | 102254087 A | 11/2011 |
| CN | 103123700 A | 5/2013 |

(Continued)

*Primary Examiner* — Ricky Go
(74) *Attorney, Agent, or Firm* — Ostrolenk Faber LLP

(57) ABSTRACT

A data processing method includes a sampling step of obtaining time series data based on a measurement result of a physical quantity in a substrate processing apparatus, an evaluation value calculation step of obtaining an evaluation value of the time series data by comparing the time series data with reference data, and a sampling period control step of controlling a sampling period used in the sampling step for each time series data. In the sampling period control step, all sampling periods are controlled to a normal period in an initial state, and when the evaluation value of the time series data is abnormal, the sampling period used when obtaining the time series data is controlled to an abnormal period shorter than the normal period.

20 Claims, 15 Drawing Sheets

(56) References Cited

U.S. PATENT DOCUMENTS

| | | |
|---|---|---|
| 2016/0035538 A1 | 2/2016 | Fukuda |
| 2016/0117847 A1 | 4/2016 | Pandev et al. |
| 2016/0349736 A1* | 12/2016 | Cheng .................... H01L 22/20 |
| 2016/0377552 A1 | 12/2016 | Paramasivam et al. |
| 2017/0023358 A1 | 1/2017 | Lee et al. |
| 2017/0068236 A1* | 3/2017 | Iname .................. G05B 19/056 |
| 2017/0116319 A1 | 4/2017 | Zhou |
| 2018/0047646 A1 | 2/2018 | Bringoltz et al. |
| 2018/0067900 A1 | 3/2018 | Mos et al. |
| 2019/0005433 A1 | 1/2019 | Sekine |

FOREIGN PATENT DOCUMENTS

| | | |
|---|---|---|
| CN | 103180793 A | 6/2013 |
| CN | 106548035 A | 3/2017 |
| CN | 107636619 A | 1/2018 |
| JP | 2008-042005 A | 2/2008 |
| JP | 2012-123521 A | 6/2012 |
| JP | 2013-257712 A | 12/2013 |
| JP | 2017-083985 A | 5/2017 |
| TW | 200537579 A | 11/2005 |
| TW | 200721348 A | 6/2007 |
| TW | 200951652 A | 12/2009 |
| TW | I422798 B | 1/2014 |
| TW | 201439501 A | 10/2014 |
| TW | 201626476 A | 7/2016 |
| TW | 201707099 A | 2/2017 |
| TW | 201710667 A | 3/2017 |
| TW | 201740220 A | 11/2017 |
| TW | 201740483 A | 11/2017 |

* cited by examiner

| TIME SERIES DATA | NORMAL PERIOD (msec) | ABNORMAL PERIOD (msec) | AUTOMATIC RETURN FLAG |
|---|---|---|---|
| CHAMBER EXHAUST PRESSURE | 1000 | 500 | TRUE |
| CHAMBER INTERNAL PRESSURE | 1000 | 500 | TRUE |
| BACKSIDE NOZZLE N2 PURGE FLOW | 300 | 100 | TRUE |
| CO2 BACKSIDE DISPENSE FLOW | 300 | 100 | FALSE |
| CO2 FIXED RINSE FOR SURFACE FLOW | 300 | 100 | FALSE |
| ⋮ | ⋮ | ⋮ | ⋮ |

| ALARM | TIME SERIES DATA | NORMAL PERIOD (msec) | ABNORMAL PERIOD (msec) | AUTOMATIC RETURN FLAG |
|---|---|---|---|---|
| INVALIDATION EXHAUST ERROR | CHAMBER EXHAUST PRESSURE | 1000 | 500 | TRUE |
| EXHAUST SWITCHING TIME IS NOT ENOUGH | CHAMBER INTERNAL PRESSURE | 1000 | 500 | TRUE |
| BACKSIDE NOZZLE – POSITION UNSETTLED | BACKSIDE NOZZLE N2 PURGE FLOW | 300 | 100 | TRUE |
| DIW CO2 – SOURCE PRESSURE LOWER LIMIT | CO2 BACKSIDE DISPENSE FLOW | 300 | 100 | FALSE |
| CO2 – SOURCE PRESSURE LOWER LIMIT | CO2 FIXED RINSE FOR SURFACE FLOW | 300 | 100 | FALSE |
| ... | ... | ... | ... | ... |

| PART | TIME SERIES DATA | UPPER LIMIT VALUE | UPPER LIMIT RATIO (%) | LOWER LIMIT VALUE | LOWER LIMIT RATIO (%) | NORMAL PERIOD (msec) | ABNORMAL PERIOD (msec) | AUTOMATIC RETURN FLAG |
|---|---|---|---|---|---|---|---|---|
| TEMPERATURE SENSOR | TEMPERATURE SENSOR VALUE | 60 | 90 | 15 | 20 | 10000 | 1000 | TRUE |
| FFU FAN | FFU FAN ROTATION SPEED | — | — | 300 | 10 | 10000 | 1000 | FALSE |
| SPIN CHUCK PIN | CHUCK PIN RINSE FLOW | 1 | 80 | — | — | 5000 | 100 | TRUE |
| CIRCULATING FILTER | CIRCULATION PRESSURE TARGET VALUE | 400 | 85 | 100 | 20 | 5000 | 500 | FALSE |
| CIRCULATION PUMP | CIRCULATION PRESSURE VALUE | 7000 | 80 | 1000 | 20 | 5000 | 500 | FALSE |
| PLC BATTERY | PLC BATTERY VALUE | — | — | 300 | 50 | 5000 | 500 | TRUE |
| ... | ... | ... | ... | ... | ... | ... | ... | ... |

16d

| TIME SERIES DATA | STANDARD DEVIATION | NORMAL PERIOD (msec) | ABNORMAL PERIOD (msec) | AUTOMATIC RETURN FLAG |
|---|---|---|---|---|
| CHAMBER EXHAUST PRESSURE | 15 | 1000 | 500 | TRUE |
| CHAMBER INTERNAL PRESSURE | 20 | 1000 | 500 | TRUE |
| BACKSIDE NOZZLE N2 PURGE FLOW | 200 | 300 | 100 | TRUE |
| CO2 BACKSIDE DISPENSE FLOW | 150 | 300 | 100 | FALSE |
| CO2 FIXED RINSE FOR SURFACE FLOW | 300 | 300 | 100 | FALSE |
| ⋮ | ⋮ | ⋮ | ⋮ | ⋮ |

| PROCESSING UNIT 1 | PROCESSING UNIT 2 | PROCESSING UNIT 3 | ... |
|---|---|---|---|
| FFU INTERNAL PRESSURE | FFU INTERNAL PRESSURE | FFU INTERNAL PRESSURE | ... |
| CHAMBER EXHAUST PRESSURE | CHAMBER EXHAUST PRESSURE | CHAMBER EXHAUST PRESSURE | ... |
| CHAMBER INTERNAL PRESSURE | CHAMBER INTERNAL PRESSURE | CHAMBER INTERNAL PRESSURE | ... |
| BACKSIDE NOZZLE N2 PURGE FLOW | SPIN REVOLUTION | SPIN SPEED DATA_ACTUAL VALUE | ... |

DATA PROCESSING METHOD, DATA PROCESSING DEVICE, AND COMPUTER-READABLE RECORDING MEDIUM HAVING RECORDED THEREON DATA PROCESSING PROGRAM

BACKGROUND OF THE INVENTION

Field of the Invention

The present invention relates to digital data processing, especially to a processing method, a processing device, and a processing program of data measured in a substrate processing apparatus.

Description of Related Art

As a method for detecting an abnormality in a device or an apparatus, there is known a method in which physical quantities (for example, length, angle, time, speed, force, pressure, voltage, current, temperature, flow) showing operating status of the device or the apparatus are measured using sensors or the like, and time series data obtained by arranging measurement results in a time-series order is analyzed. When the device or the apparatus performs a same operation under a same condition, the time series data changes similarly if there are no abnormalities. Therefore, it is possible to detect abnormal time series data by mutually comparing a plurality of pieces of time series data which is expected to change similarly and specify an occurring position and a cause of the abnormality by analyzing the abnormal time series data.

In a manufacturing process of a semiconductor substrate (hereinafter referred to as a substrate), a series of processing is performed using a plurality of substrate processing apparatuses. The substrate processing apparatus includes a plurality of processing units for performing, on the substrate, specific processing in the series of processing. Each processing unit performs the processing on the substrate in accordance with a predetermined procedure (called a recipe). At this time, time series data is obtained based on measurement results in each processing unit. It is possible to specify the processing unit in which the abnormality occurs and the cause of the abnormality by analyzing the obtained time series data.

Related to the invention of the present application, Japanese Laid-Open Patent Publication No. 2008-42005 discloses a data collecting method in which a sampling period is switched depending on status of a substrate processing apparatus, when collecting measurement data from a measuring instrument using a predetermined sampling period. Japanese Laid-Open Patent Publication No. 2017-83985 discloses a data processing device for classifying a plurality of pieces of time series data into a plurality of groups, obtaining a degree of abnormality of each group and a degree of abnormality of the time series data in each group, and displaying a ranking result of the groups or the time series data based on the degree of abnormality.

However, the data collecting method disclosed in Japanese Laid-Open Patent Publication No. 2008-42005 has a problem that detailed data can not be obtained before an abnormality occurs in the substrate processing apparatus, because switching timing of the sampling period is not appropriate.

SUMMARY OF THE INVENTION

Therefore, an object of the present invention is to provide a data processing method capable of obtaining detailed data before an abnormality occurs in a substrate processing apparatus.

According to a first aspect of the present invention, there is provided a data processing method including: a sampling step of obtaining time series data based on a measurement result of a physical quantity in a substrate processing apparatus; an evaluation value calculation step of obtaining an evaluation value of the time series data by comparing the time series data with reference data; and a sampling period control step of controlling a sampling period used in the sampling step for each time series data, wherein in the sampling period control step, all sampling periods used in the sampling step are controlled to a normal period in an initial state, and when the evaluation value of the time series data is abnormal, the sampling period used when obtaining the time series data is controlled to an abnormal period shorter than the normal period.

According to a second aspect of the present invention, in the first aspect of the present invention, in the sampling period control step, when an alarm occurs in the substrate processing apparatus, the sampling period used when obtaining the time series data associated to the alarm is controlled to the abnormal period.

According to a third aspect of the present invention, in the first aspect of the present invention, in the sampling period control step, when a value of the time series data exceeds a predetermined threshold value, the sampling period used when obtaining the time series data is controlled to the abnormal period.

According to a fourth aspect of the present invention, in the first aspect of the present invention, in the sampling period control step, when a variation in the time series data exceeds a predetermined acceptable value, the sampling period used when obtaining the time series data is controlled to the abnormal period.

According to a fifth aspect of the present invention, in the first aspect of the present invention, in the sampling period control step, when the sampling period used when obtaining the time series data is controlled to the abnormal period, a sampling period used when obtaining another time series data associated to the time series data is controlled to the abnormal period.

According to a sixth aspect of the present invention, in the fifth aspect of the present invention, in the sampling period control step, the sampling period used when obtaining the other time series data is controlled to the abnormal period using a factor relation table storing kinds of the time series data in a mutually associated manner.

According to a seventh aspect of the present invention, in the first aspect of the present invention, in the sampling period control step, the sampling period used when obtaining the time series data is controlled using a sampling period definition table storing the normal period and the abnormal period in association with a kind of the time series data.

According to an eighth aspect of the present invention, in the seventh aspect of the present invention, the sampling period definition table further stores an automatic return flag in association with the kind of the time series data, and in the sampling period control step, the sampling period used when obtaining the time series data is controlled to the normal period, when a cause for which the sampling period used when obtaining the time series data is controlled to the abnormal period is solved and the automatic return flag corresponding to the time series data stored in the sampling period definition table is valid.

According to a ninth aspect of the present invention, in the first aspect of the present invention, in the sampling step, the time series data is obtained by extracting data from measurement data obtained in the substrate processing apparatus, using the sampling period controlled in the sampling period control step.

According to a tenth aspect of the present invention, in the first aspect of the present invention, the reference data is another time series data.

According to an eleventh aspect of the present invention, there is provided a data processing device including: a sampling section configured to obtain time series data based on a measurement result of a physical quantity in a substrate processing apparatus; an evaluation value calculation section configured to obtain an evaluation value of the time series data by comparing the time series data with reference data; and a sampling period control section configured to control a sampling period used in the sampling section for each time series data, wherein the sampling period control section controls all sampling periods used in the sampling section to a normal period in an initial state, and when the evaluation value of the time series data is abnormal, the sampling period control section controls the sampling period used when obtaining the time series data to an abnormal period shorter than the normal period.

According to a twelfth aspect of the present invention, in the eleventh aspect of the present invention, when an alarm occurs in the substrate processing apparatus, the sampling period control section controls the sampling period used when obtaining the time series data associated to the alarm to the abnormal period.

According to a thirteenth aspect of the present invention, in the eleventh aspect of the present invention, when a value of the time series data exceeds a predetermined threshold value, the sampling period control section controls the sampling period used when obtaining the time series data to the abnormal period.

According to a fourteenth aspect of the present invention, in the eleventh aspect of the present invention, when a variation in the time series data exceeds a predetermined acceptable value, the sampling period control section controls the sampling period used when obtaining the time series data to the abnormal period.

According to a fifteenth aspect of the present invention, in the eleventh aspect of the present invention, when controlling the sampling period used when obtaining the time series data to the abnormal period, the sampling period control section controls a sampling period used when obtaining another time series data associated to the time series data to the abnormal period.

According to a sixteenth aspect of the present invention, in the fifteenth aspect of the present invention, the data processing device further includes a factor relation table storing kinds of the time series data in a mutually associated manner, and the sampling period control section controls the sampling period used when obtaining the other time series data to the abnormal period using the factor relation table.

According to a seventeenth aspect of the present invention, in the eleventh aspect of the present invention, the data processing device further includes a sampling period definition table storing the normal period and the abnormal period in association with a kind of the time series data, and the sampling period control section controls the sampling period used when obtaining the time series data using the sampling period definition table.

According to an eighteenth aspect of the present invention, in the seventeenth aspect of the present invention, the sampling period definition table further stores an automatic return flag in association with the kind of the time series data, and the sampling period control section controls the sampling period used when obtaining the time series data to the normal period, when a cause for which the sampling period used when obtaining the time series data is controlled to the abnormal period is solved and the automatic return flag corresponding to the time series data stored in the sampling period definition table is valid.

According to a nineteenth aspect of the present invention, in the eleventh aspect of the present invention, the sampling section obtains the time series data by extracting data from measurement data measured in the substrate processing apparatus, using the sampling period controlled by the sampling period control section.

According to a twentieth aspect of the present invention, there is provided a computer-readable recording medium having recorded thereon a data processing program, the data processing program causing a computer to execute a method by a CPU using a memory, the method including: a sampling step of obtaining time series data based on a measurement result of a physical quantity in a substrate processing apparatus; an evaluation value calculation step of obtaining an evaluation value of the time series data by comparing the time series data with reference data; and a sampling period control step of controlling a sampling period used in the sampling step for, each time series data, wherein in the sampling period control step, all sampling periods used in the sampling step are controlled to a normal period in an initial state, and when the evaluation value of the time series data is abnormal, the sampling period used when obtaining the time series data is controlled to an abnormal period shorter than the normal period.

According to the first, eleventh, or twentieth aspect, when the evaluation value obtained by comparing the time series data with the reference data is abnormal, the sampling period used when obtaining the time series data is shortened. With this, the sampling period can be switched at a suitable timing for each time series data, and detailed data can be obtained before an abnormality occurs in the substrate processing apparatus.

According to the second or twelfth aspect, when the alarm occurs in the substrate processing apparatus, the sampling period used when obtaining the time series data associated to the occurring alarm can be shortened and the detailed data can be obtained.

According to the third or thirteenth aspect, when the value of the time series data exceeds the threshold value as an omen of a failure of the substrate processing apparatus, the sampling period used when obtaining the time series data can be shortened and the detailed data can be obtained.

According to the fourth or fourteenth aspect, when the variation in the time series data exceeds the acceptable value, the sampling period used when obtaining the time series data can be shortened and the detailed data can be obtained.

According to the fifth or fifteenth aspect, when shortening a sampling period used when obtaining certain time series data, a sampling period used when obtaining another related time series data is shortened. With this, detailed data with respect to a plurality of pieces of mutually related time series data can be obtained together.

According to the sixth or sixteenth aspect, the sampling period used when obtaining the other time series data can be controlled easily by using the factor relation table.

According to the seventh or seventeenth aspect, the sampling period used when obtaining the time series data can be controlled easily by using the sampling period definition table.

According to the eighth or eighteenth aspect, the sampling period used when obtaining the time series data can be automatically controlled to the normal period depending on characteristics of the time series data, by using the sampling period definition table storing the automatic return flag.

According to the ninth or nineteenth aspect, desired time series data can be obtained by extracting data from the measurement data obtained in the substrate processing apparatus.

According to the tenth aspect, an evaluation value suitable for the time series data can be obtained by using the other time series data as the reference data.

These and other objects, features, modes and effects of the present invention will be more apparent from the following detailed description with reference to the attached drawings.

BRIEF DESCRIPTION OF THE DRAWINGS

FIG. 5A is a diagram showing a sampling period definition table of the data processing device shown in FIG. 1.

FIG. 5B is a diagram showing another sampling period definition table of the data processing device shown in FIG. 1.

FIG. 5C is a diagram showing another sampling period definition table of the data processing device shown in FIG. 1.

FIG. 6 is a diagram showing a factor relation table of the data processing device shown in FIG. 1.

DETAILED DESCRIPTION OF THE INVENTION

In the following, a data processing method, a data processing device, and a data processing program according to an embodiment of the present invention are described with reference to the drawings. The data processing method according to the present embodiment is typically performed using a computer. The data processing program according to the present embodiment is a program for performing the data processing method using a computer. The data processing device according to the present embodiment is typically configured using a computer. The computer executing the data processing program functions as the data processing device.

Figure 1:
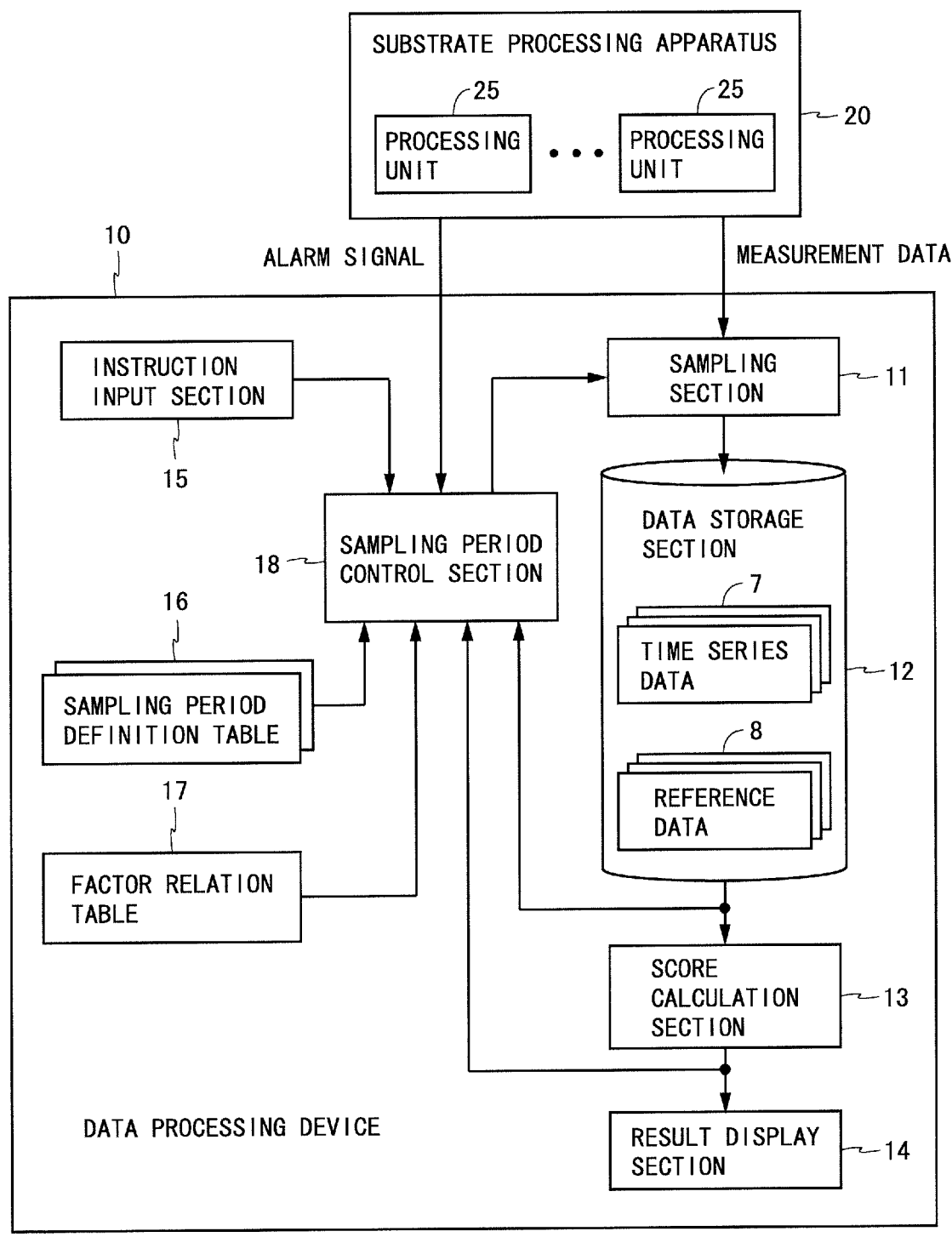
FIG. 1 is a block diagram showing a configuration of a data processing device according to an embodiment of the present invention.

FIG. 1 is a block diagram showing a configuration of a data processing device according to an embodiment of the present invention. A data processing device 10 shown in FIG. 1 includes a sampling section 11, a data storage section 12, a score calculation section 13, a result display section 14, an instruction input section 15, a plurality of sampling period definition tables 16, a factor relation table 17, and a sampling period control section 18. The data processing device 10 is used being connected to a substrate processing apparatus 20.

The substrate processing apparatus 20 includes a plurality of processing units 25, and a plurality of physical quantities (for example, length, angle, time, speed, force, pressure, voltage, current, temperature, flow) showing operating status of the processing unit 25 is measured in each processing unit 25. The substrate processing apparatus 20 outputs measurement data obtained in each processing unit 25 to the data processing device 10.

The sampling section 11 obtains time series data 7 based on measurement results of the physical quantity in the substrate processing apparatus 20. More specifically, the sampling section 11 obtains the time series data 7 by extracting data from the measurement data obtained in the substrate processing apparatus 20, using a certain time interval (hereinafter referred to as a sampling period). The sampling period control section 18 controls the sampling period used in the sampling section 11 for each time series data 7. The data storage section 12 stores the time series data 7 obtained by the sampling section 11 and reference data 8 which is expected value data of the time series data 7. For example, another time series data determined as optimal for the expected value data in a lot of time series data is used as the reference data 8.

The score calculation section 13 obtains an evaluation value (hereinafter referred to as a score) with respect to the time series data 7 stored in the data storage section 12. The score calculation section 13 reads the time series data 7 and corresponding reference data 8 from the data storage section 12, and compares both to obtain the score. The score calculation section 13 functions as an evaluation value calculation section obtaining the evaluation value of the time series data 7. The result display section 14 displays a screen based on the score of the time series data 7.

The substrate processing apparatus 20 outputs, to the data processing device 10, an alarm signal showing whether an alarm occurs in the substrate processing apparatus 20. An instruction from a user (operator of the substrate processing apparatus 20) is input to the instruction input section 15. The sampling period definition table 16 at least stores a normal period and an abnormal period in association with a kind of the time series data. The factor relation table 17 stores, for each processing unit 25, kinds of the time series data in a mutually associated manner. Details of the sampling period definition table 16 and the factor relation table 17 will be described later.

The time series data 7 stored in the data storage section 12, the score obtained by the score calculation section 13, the alarm signal output from the substrate processing apparatus 20, and the user's instruction which is input using the instruction input section 15 are input to the sampling period control section 18. Based on these inputs, the sampling period control section 18 controls the sampling period used in the sampling section 11 for each time series data 7 using the sampling period definition tables 16 and the factor relation table 17. The sampling period control section 18 controls all sampling periods used in the sampling section 11 to the normal period in an initial state, and when the score of the time series data 7 is abnormal, the sampling period control section 18 controls the sampling period used when obtaining the time series data 7 to the abnormal period shorter than the normal period.

Figure 2:
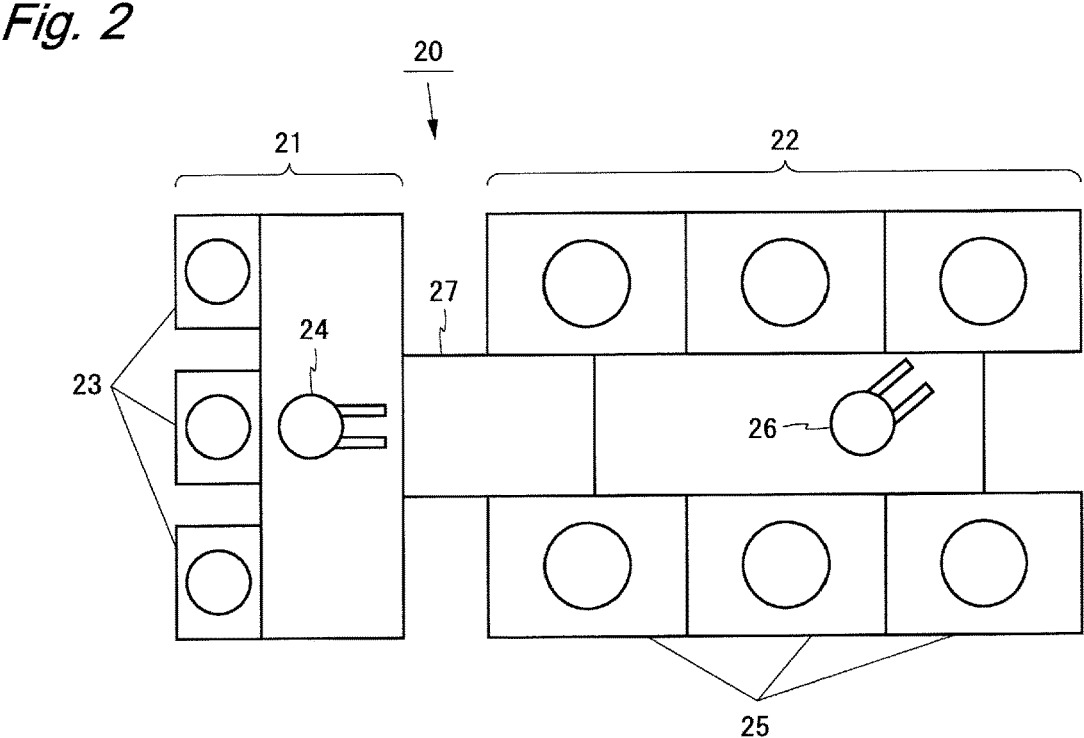
FIG. 2 is a diagram showing a schematic configuration of a substrate processing apparatus shown in FIG. 1.

FIG. 2 is a diagram showing a schematic configuration of the substrate processing apparatus 20. The substrate processing apparatus 20 includes an indexer section 21 and a processing section 22. The indexer section 21 includes a plurality of cassette holding sections 23 and an indexer robot 24. The processing section 22 includes a plurality of processing units 25 and a substrate transfer robot 26. A cassette (not shown) including a plurality of substrates is set to the cassette holding section 23. The indexer robot 24 performs an operation for taking out a substrate from the cassette and an operation for putting the substrate into the cassette. The processing unit 25 has rooms (hereinafter referred to as chambers) for performing processing on the substrate. The chamber corresponds one to one with the processing unit 25. For example, processing of cleaning the substrate using processing liquid is performed in the chamber. The substrate transfer robot 26 performs an operation for carrying the substrate in the processing unit 25 and an operation for carrying the substrate out of the processing unit 25. The number of the processing units 25 is twenty-four, for example. In this case, for example, tower structures each including four stacked processing units 25 are provided at six positions around the substrate transfer robot 26.

The indexer robot 24 takes out a processing-target substrate from the cassette set to the cassette holding section 23, and passes the taken-out substrate to the substrate transfer robot 26 via a substrate receiving/transferring section 27. The substrate transfer robot 26 carries the substrate received from the indexer robot 24 in a target processing unit 25. After the processing on the substrate is completed, the substrate transfer robot 26 takes out the substrate from the target processing unit 25, and passes the taken-out substrate to the indexer robot 24 via the substrate receiving/transferring section 27. The indexer robot 24 puts the substrate received from the substrate transfer robot 26 into a target cassette. Control of the indexer section 21 and the processing section 22 is performed by a control section (not shown) of the substrate processing apparatus 20.

Figure 3:
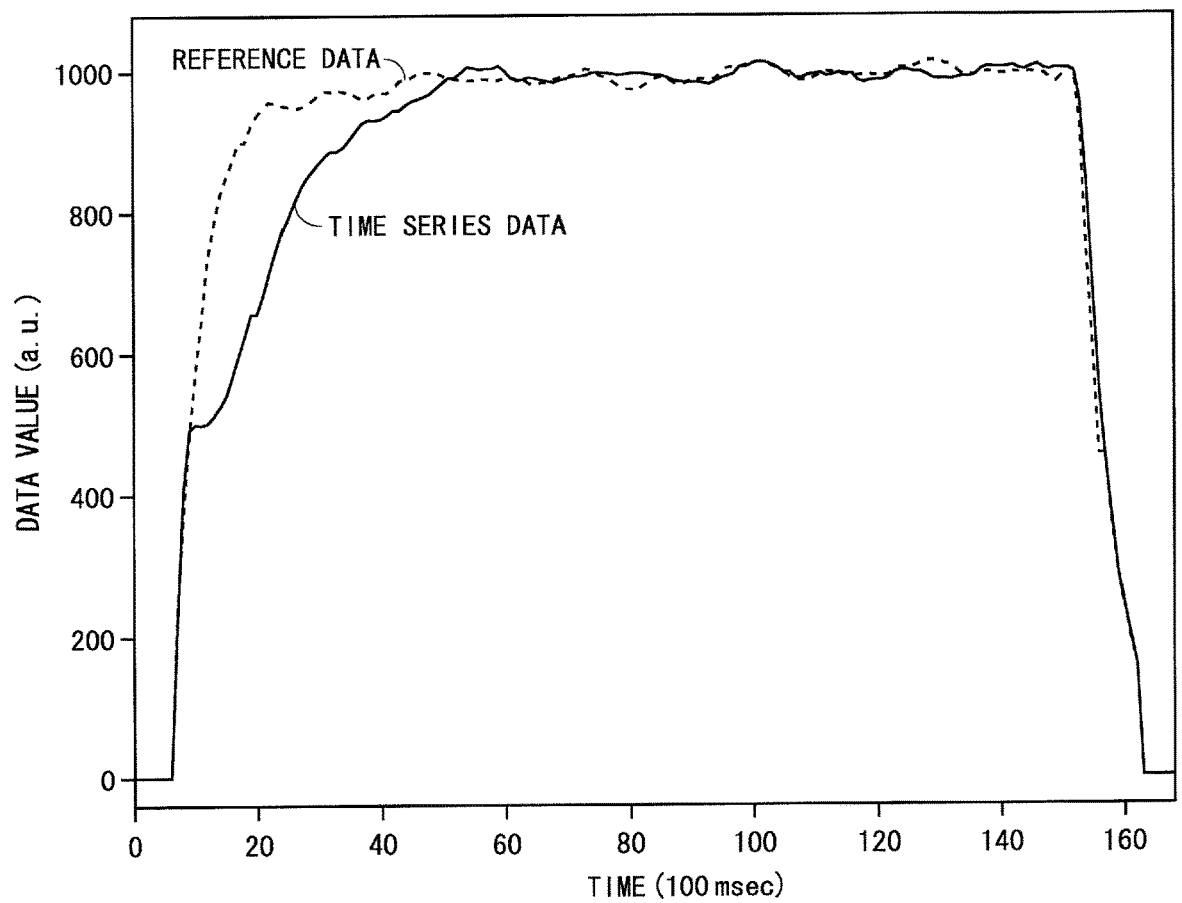
FIG. 3 is a diagram showing a graph of time series data in the data processing device shown in FIG. 1.

Hereinafter, processing performed by the processing unit 25 on one substrate is referred to as a "unit processing". During execution of the unit processing, a plurality of physical quantities is measured in the processing unit 25 using sensors or the like. The sampling section 11 obtains the time series data 7 based on the measurement data measured in the processing unit 25. When the substrate processing apparatus 20 performs one unit processing, a plurality of pieces of time series data 7 is obtained. When the time series data 7 is shown in a graph form, a graph shown in FIG. 3 as a solid line is obtained, for example. When corresponding reference data 8 is shown in a graph form, a graph shown in FIG. 3 as a broken line is obtained, for example. In an example shown in FIG. 3, the time series data 7 is behind the reference data 8 when rising.

Figure 4:
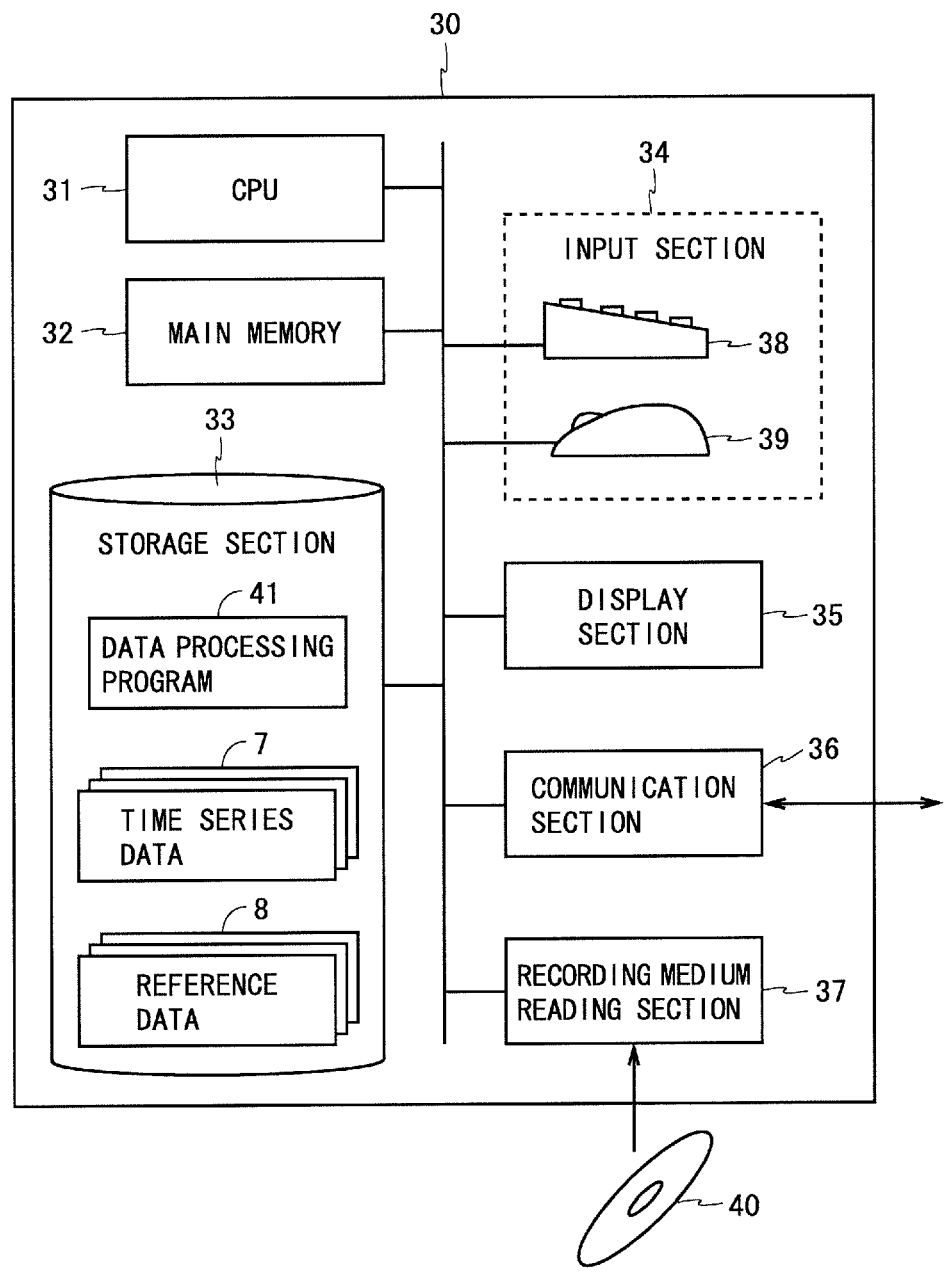
FIG. 4 is a block diagram showing a configuration example of a computer functioning as the data processing device shown in FIG. 1.
Figure 5D:
FIG. 5D is a diagram showing another sampling period definition table of the data processing device shown in FIG. 1.

FIG. 4 is a block diagram showing a configuration example of a computer functioning as the data processing device 10. A computer 30 shown in FIG. 4 includes a CPU 31, a main memory 32, a storage section 33, an input section 34, a display section 35, a communication section 36, and a recording medium reading section 37. A DRAM is used for the main memory 32, for example. A hard disk is used for the storage section 33, for example. A keyboard 38 and a mouse 39 are included in the input section 34, for example. A liquid crystal display is used for the display section 35, for example. The communication section 36 is an interface circuit of cable communication or wireless communication. Communication with the substrate processing apparatus 20 is performed using the communication section 36. The recording medium reading section 37 is an interface circuit of a recording medium 40 having recorded thereon a program and the like. A non-transitory recording medium, such as a CD-ROM, is used for the recording medium 40, for example. Note that the configuration of the computer 30 described above is only an example, and the data processing device 10 can be configured using arbitrary computers.

In the following, a case in which the computer 30 functions as the data processing device 10 is described. In this case, the storage section 33 stores a data processing program 41 and the reference data 8. For example, the data processing program 41 and the reference data 8 may be received from a server or another computer using the communication section 36, or may be read out from the recording medium 40 using the recording medium reading section 37. When the data processing program 41 is to be executed, the data processing program 41 and the reference data 8 are copied and transferred to the main memory 32. The CPU 31 performs processing for obtaining the time series data 7 based on the measurement data which is output from the substrate processing apparatus 20, processing for obtaining the score of the time series data 7, processing for controlling, based on the score, the sampling period used when obtaining the time series data 7, and the like, by executing the data processing program 41 stored in the main memory 32 using the main memory 32 as a work memory. At this time, the computer 30 functions as the data processing device 10.

The data processing device 10 includes four sampling period definition tables 16a to 16d shown in FIGS. 5A to 5D, and the factor relation table 17 shown in FIG. 6. Before the data processing device 10 and the substrate processing apparatus 20 start operation, data described in the drawings are stored in advance in the sampling period definition tables 16a to 16d and the factor relation table 17.

Figure 7:
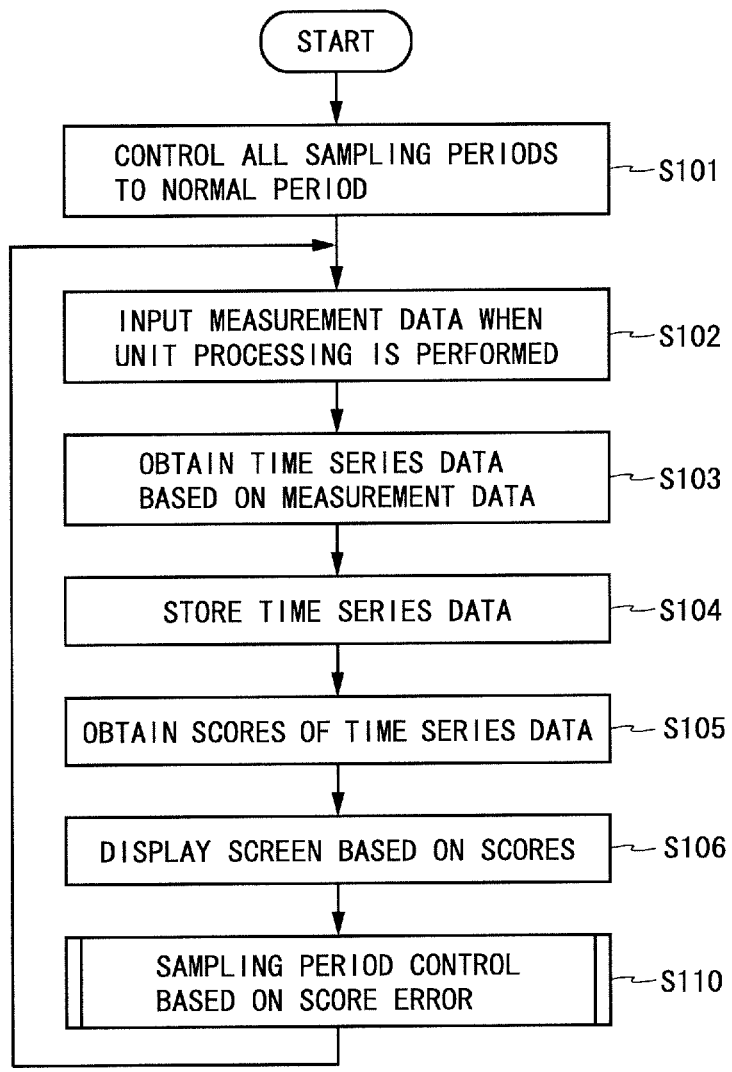
FIG. 7 is a flowchart showing an operation of the data processing device shown in FIG. 1.

FIG. 7 is a flowchart showing an operation of the data processing device 10. The data processing device 10 performs processing shown in FIG. 7 when the CPU 31 executes the data processing program 41 using the main memory 32.

As shown in FIG. 7, the sampling period control section 18 first controls all sampling periods used in the sampling section 11 to a normal period (step S101). In step S101, the sampling period control section 18 sets the sampling periods used when obtaining the time series data 7 to the normal periods stored in the sampling period definition tables 16a to 16d, with respect to all time series data 7.

After the data processing device 10 executes step S101, the substrate processing apparatus 20 starts processing on a substrate. When the substrate processing apparatus 20 performs one unit processing, a plurality of pieces of measurement data is obtained. The plurality of pieces of measurement data is output from the substrate processing apparatus 20 to the data processing device 10. The data processing device 10 executes steps S102 to S110, each time the plurality of pieces of measurement data is output from the substrate processing apparatus 20.

The plurality of pieces of measurement data obtained when the unit processing is performed is input to the sampling section 11 (step S102). Next, the sampling section 11 obtains a plurality of pieces of time series data 7 based on the plurality of pieces of measurement data which is input in step S102 (step S103). In step S103, the sampling section 11 obtains the time series data 7 by extracting data from the plurality of pieces of measurement data which is output from the substrate processing apparatus 20, using a sampling period controlled for each time series data 7.

Next, the data storage section 12 stores the plurality of pieces of time series data 7 obtained in step S103 (step S104). Next, the score calculation section 13 obtains scores of the plurality of pieces of time series data 7 stored in the data storage section 12 (step S105). In step S105, the score calculation section 13 obtains the score by comparing each time series data 7 with corresponding reference data 8. Next, the result display section 14 displays a screen based on the scores obtained in step S105 (step S106). The screen displayed by the result display section 14 may be arbitrary so long as the screen is based on the scores of the time series data 7.

Figure 8:
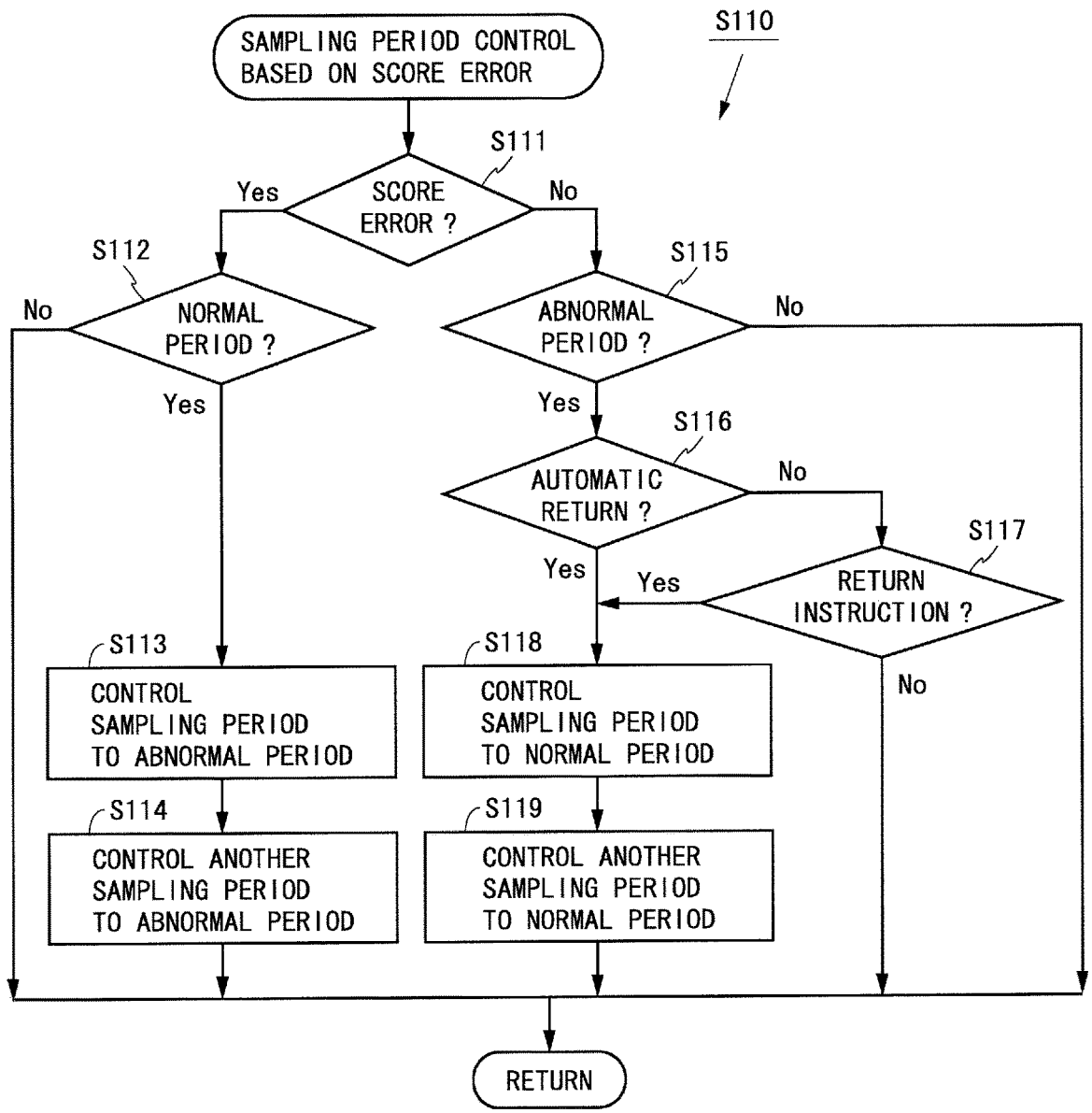
FIG. 8 is a flowchart showing details of a sampling period control based on a score error by the data processing device shown in FIG. 1.

Next, the sampling period control section 18 performs a sampling period control based on a score error (step S110). FIG. 8 is a flowchart showing details of the sampling period control based on the score error. In step S110, the sampling period control section 18 performs processing shown in FIG. 8 on the time series data 7 of which status of the score changes (time series data of which score changes from normal to abnormal, or oppositely). Hereinafter, time series data processed in step S110 is referred to as SQI.

The sampling period definition table 16a shown in FIG. 5A stores the normal period, the abnormal period, and an automatic return flag in association with a kind of time series data. The normal period shows the sampling period in a normal state in unit of msec (millisecond). The abnormal period shows the sampling period in an abnormal state in unit of msec. The abnormal period is shorter than the normal period. For example, the abnormal period is set to be not longer than ⅓ of the normal period. The automatic return flag takes a value of TRUE or FALSE. The value TRUE shows that an automatic return is valid, and the value FALSE shows that the automatic return is invalid.

In FIG. 8, the sampling period control section 18 determines first whether the score of the time series data SQ1 is abnormal (whether an score error occurs), goes to step S112 if Yes, and goes to step S115 if No (step S111).

If Yes in step S111, the sampling period control section 18 determines whether the sampling period used when obtaining the time series data SQ1 is the normal period, and goes to step S113 if Yes (step S112). In this case, the sampling period control section 18 controls the sampling period used when obtaining the time series data SQ1 to the abnormal period (step S113). In step S113, the sampling period control section 18 reads the abnormal period corresponding to the kind of the time series data SQ1 from the sampling period definition table 16a, and sets the sampling period used when obtaining the time series data SQ1 from next time onwards to the read abnormal period.

Next, the sampling period control section 18 controls another sampling period to the abnormal period if necessary (step S114). The factor relation table 17 shown in FIG. 6 stores the kinds of the time series data 7 in a mutually associated manner for each processing unit 25. If the processing unit 25 corresponding to the time series data SQ1 is PU and the kind of the time series data SQ1 is stored in a field of the processing unit PU of the factor relation table 17, the sampling period control section 18 controls the sampling period used when obtaining another time series data stored in the field, to the abnormal period in step S114.

If No in step S111, the sampling period control section 18 determines whether the sampling period used when obtaining the time series data SQ1 is the abnormal period, and goes to step S116 if Yes (step S115). In this case, the sampling period control section 18 determines whether to perform the automatic return, goes to step S118 if Yes, and goes to step S117 if No (step S116). In step S116, the sampling period control section 18 reads the automatic return flag corresponding to the kind of the time series data SQ1 from the sampling period definition table 16a, goes to step S118 if the automatic return flag is TRUE, and goes to step S117 otherwise.

If No in step S116, the sampling period control section 18 determines whether a return instruction is input, and goes to step S118 if Yes (step S117). If the sampling period used when obtaining the time series data SQ1 is controlled to the abnormal period, the user inputs the return instruction using the instruction input section 15 after confirming status of the score error or performing an operation for recovering the status of the score error. The return instruction input by the user is held in the sampling period control section 18. In step S117, if the return instruction has already been input, the sampling period control section 18 goes to step S118.

If Yes in step S116 or S117, the sampling period control section 18 controls the sampling period used when obtaining the time series data SQ1 to the normal period (step S118). In step S118, the sampling period control section 18 reads the normal period corresponding to the kind of the time series data SQ1 from the sampling period definition table 16a, and sets the sampling period used when obtaining the time series data SQ1 from next time onwards to the read normal period.

Next, the sampling period control section 18 controls another sampling period to the normal period if necessary (step S119). If the processing unit 25 corresponding to the time series data SQ1 is PU and the kind of the time series data SQ1 is stored in the field of the processing unit PU of the factor relation table 17, the sampling period control section 18 controls the sampling period used when obtaining another time series data stored in the field, to the normal period in step S119. The sampling period control section 18 finishes step S110 after executing step S114 or S119 or after determining No in step S112, S115, or S117.

Figure 9A:
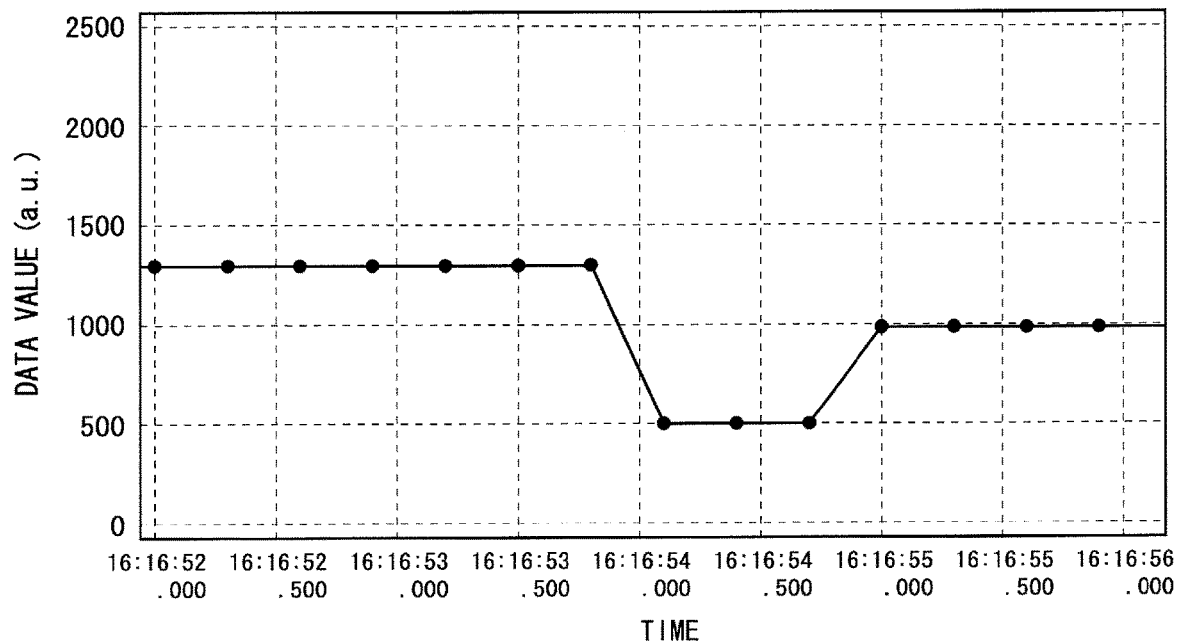
FIG. 9A is a diagram showing a graph of time series data obtained using a normal period in the data processing device shown in FIG. 1.
Figure 9B:
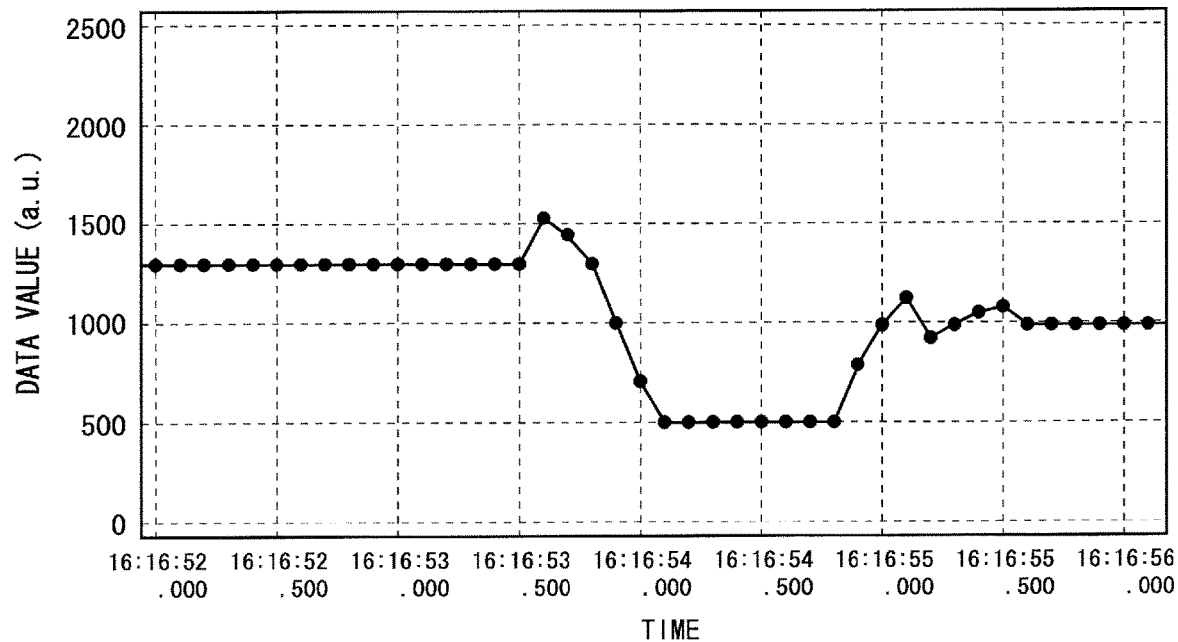
FIG. 9B is a diagram showing a graph of time series data obtained using an abnormal period in the data processing device shown in FIG. 1.

For example, it is assumed that the normal period used when obtaining certain time series data is 300 msec and the abnormal period of that is 100 msec. FIG. 9A is a diagram showing a graph of the time series data obtained using the normal period. Even when the user looks at the graph shown in FIG. 9A, the user can not recognize a small change in the time series data. In the data processing device 10, when the score of the time series data is abnormal, the sampling period control section 18 controls the sampling period used when obtaining the time series data to the abnormal period (100 msec). FIG. 9B is a diagram showing a graph of the time series data obtained using the abnormal period. When the user looks at the graph shown in FIG. 9B, the user can recognize the small change in the time series data easily.

Figure 10:
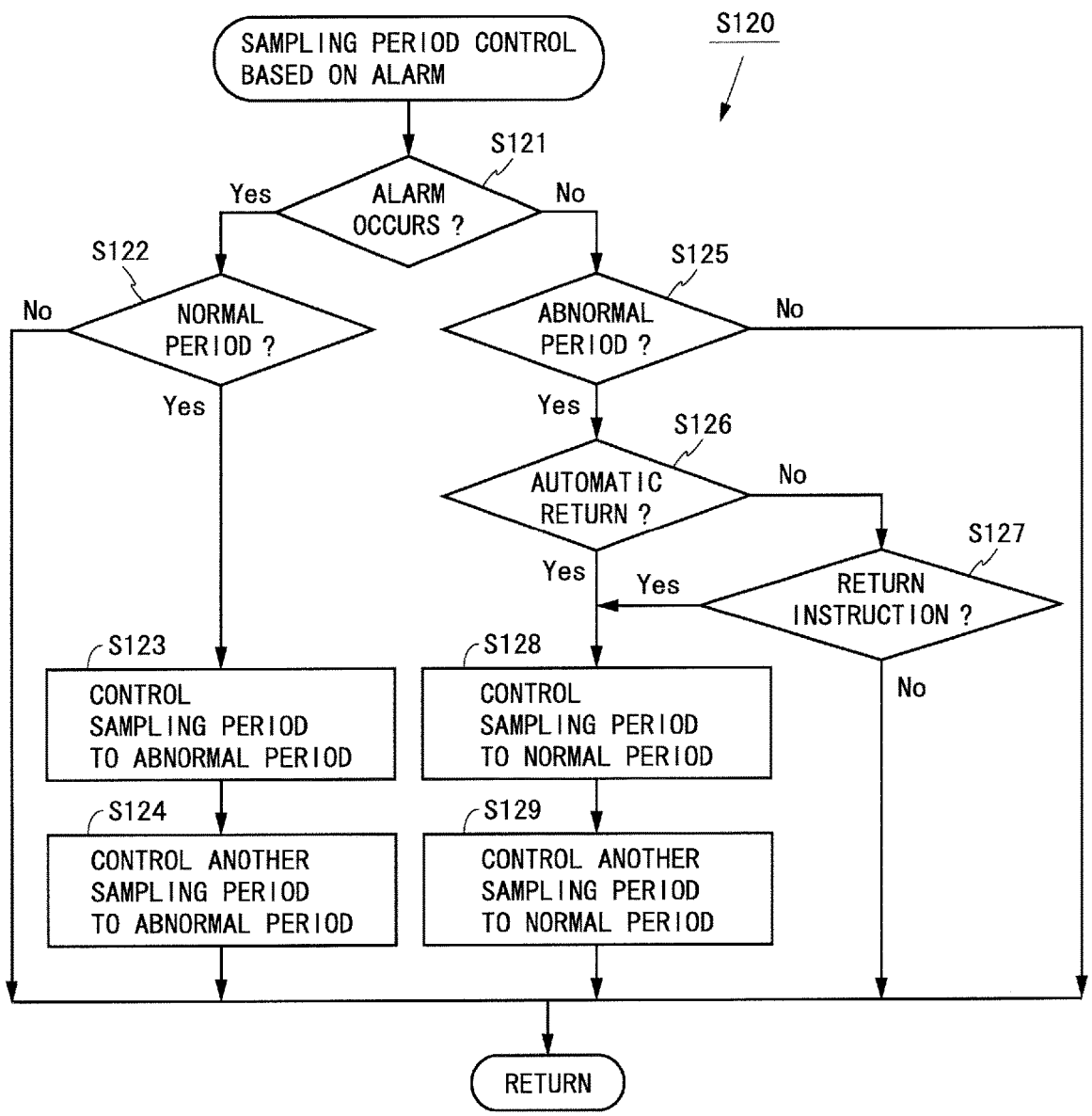
FIG. 10 is a flowchart showing details of a sampling period control based on an alarm by the data processing device shown in FIG. 1.
Figure 11:
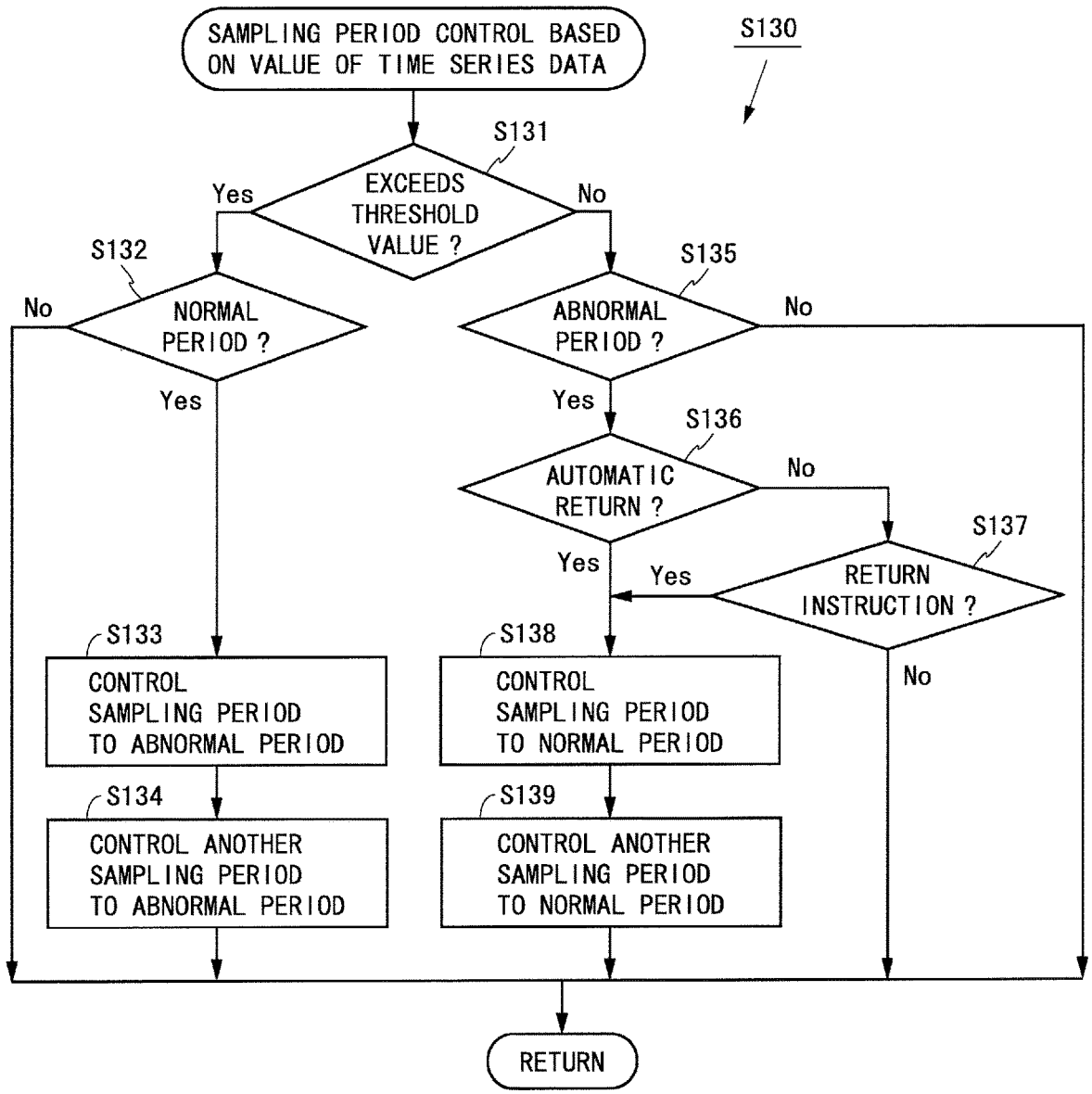
FIG. 11 is a flowchart showing details of a sampling period control based on a value of time series data by the data processing device shown in FIG. 1.
Figure 12:
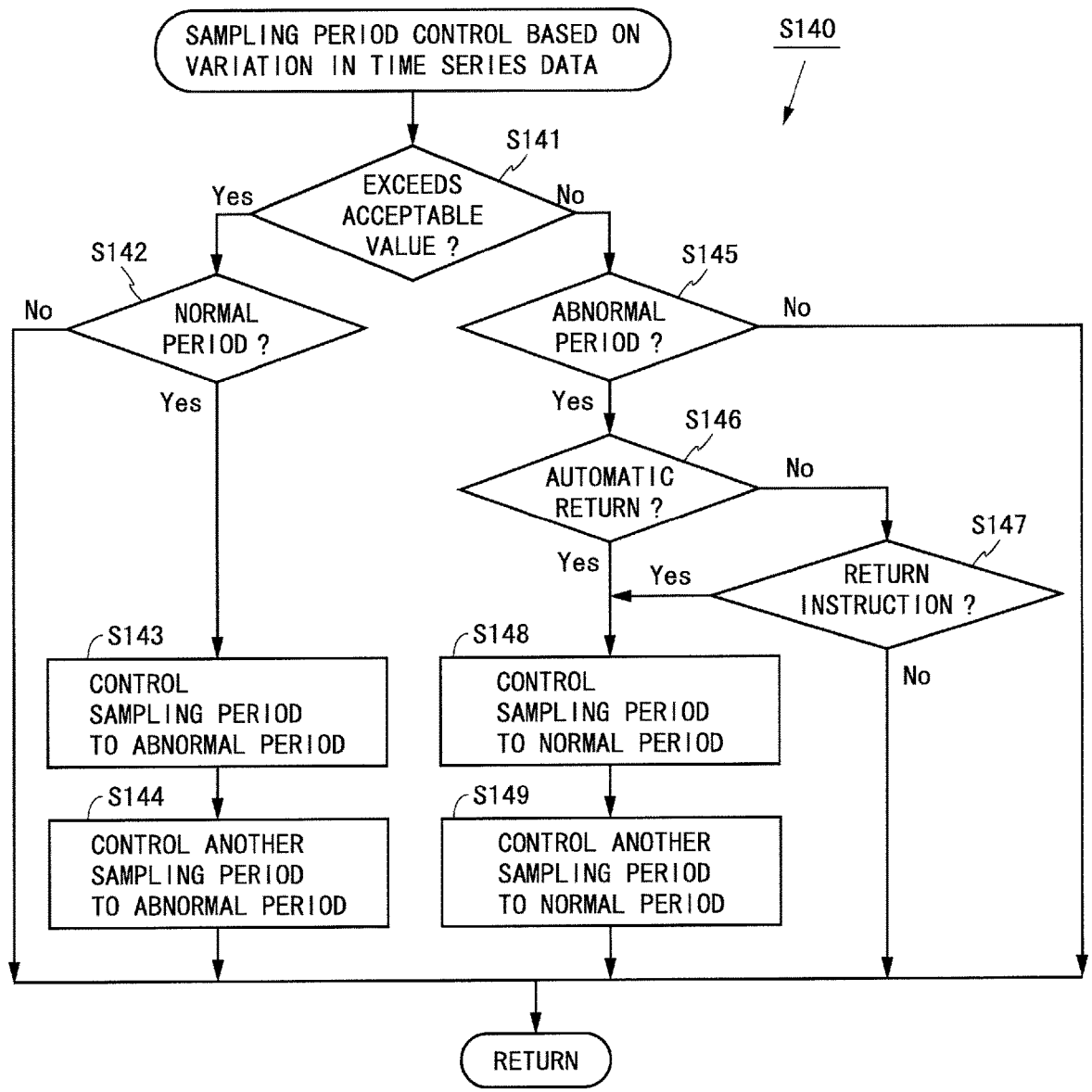
FIG. 12 is a flowchart showing details of a sampling period control based on a variation in time series data by the data processing device shown in FIG. 1.

The sampling period control section 18 performs sampling period controls shown in FIGS. 10 to 12 in addition to the sampling period control shown in FIG. 8. The sampling period controls shown in FIGS. 10 to 12 are performed when a predetermined condition is satisfied while performing processing shown in FIG. 7.

FIG. 10 is a flowchart showing details of a sampling period control based on an alarm. As described above, the alarm signal showing whether an alarm occurs in the substrate processing apparatus 20 is input to the data processing device 10. The sampling period control section 18 performs processing shown in FIG. 10 with respect to the alarm of which occurrence state changes (alarm which changes from "exists" to "not exist", or oppositely). Hereinafter, the alarm processed in step S120 is referred to as AL, and the time series data associated to the alarm AL is referred to as SQ2.

The sampling period definition table 16b shown in FIG. 5B stores the kind of the time series data, the normal period, the abnormal period, and the automatic return flag in association with a kind of the alarm. It can be said that the sampling period definition table 16b stores the kind of the alarm, the normal period, the abnormal period, and the automatic return flag in association with the kind of the time series data.

In FIG. 10, the sampling period control section 18 determines first whether the alarm AL occurs (alarm occurs or is solved), goes to step S122 if Yes, and goes to step S125 if No (step S121).

If Yes in step S121, the sampling period control section 18 determines whether the sampling period used when obtaining the time series data SQ2 associated to the alarm AL is the normal period, and goes to step S123 if Yes (step S122). In this case, the sampling period control section 18 controls the sampling period used when obtaining the time series data SQ2 to the abnormal period (step S123). In step S123, the sampling period control section 18 reads the abnormal period corresponding to the kinds of the alarm AL and the time series data SQ2 from the sampling period definition table 16b, and sets the sampling period used when obtaining the time series data SQ2 from next time onwards to the read abnormal period. Next, the sampling period control section 18 controls another sampling period to the abnormal period with reference to the factor relation table 17 if necessary, as with step S114 shown in FIG. 8 (step S124).

If No in step S121, the sampling period control section 18 determines whether the sampling period used when obtaining the time series data SQ2 is the abnormal period, and goes to step S126 if Yes (step S125). In this case, the sampling period control section 18 determines whether to perform the automatic return, goes to step S128 if Yes, and goes to step S127 if No (step S126). In step S126, the sampling period control section 18 reads the automatic return flag corresponding to the kinds of the alarm AL and the time series data SQ2 from the sampling period definition table 16b, goes to step S128 if the automatic return flag is TRUE, and goes to step S127 otherwise.

If No in step S126, the sampling period control section 18 determines whether the return instruction is input, and goes to step S128 if Yes (step S127). If the alarm AL occurs, the user inputs the return instruction using the instruction input section 15 after investigating a cause of the alarm AL or performing an operation for solving the alarm AL. In step S127, if the return instruction has already been input, the sampling period control section 18 goes to step S128.

If Yes in step S126 or S127, the sampling period control section 18 controls the sampling period used when obtaining the time series data SQ2 to the normal period (step S128). In step S128, the sampling period control section 18 reads the normal period corresponding to the kinds of the alarm AL and the time series data SQ2 from the sampling period definition table 16b, and sets the sampling period used when obtaining the time series data SQ2 from next time onwards to the read normal period. Next, the sampling period control section 18 controls another sampling period to the normal period with reference to the factor relation table 17 if necessary, as with step S119 shown in FIG. 8 (step S129). The sampling period control section 18 finishes step S120 after executing step S124 or S129 or after determining No in step S122, S125, or S127.

FIG. 11 is a flowchart showing details of a sampling period control based on a value of the time series data. The sampling period definition table 16c shown in FIG. 5C stores the kind of the time series data, an upper limit value, an upper limit ratio, a lower limit value, a lower limit ratio, the normal period, the abnormal period, and the automatic return flag in association with a kind of a part. It can be said that the sampling period definition table 16c stores the kind of the part, the upper limit value, the upper limit ratio, the lower limit value, the lower limit ratio, the normal period, the abnormal period, and the automatic return flag in association with the kind of the time series data. The sampling period control section 18 performs processing shown in FIG. 11 on the time series data 7 with respect to which magnitude relation between a value and a threshold value changes (time series data of which value changes from "not exceed threshold value" to "exceeds threshold value", or oppositely). Hereinafter, the time series data processed in step S130 is referred to as SQ3.

The upper limit value shows an upper limit value of the time series data. The upper limit ratio shows a ratio of an upper-side threshold value of the time series data to the upper limit value of the time series data in percentage. The lower limit value shows a lower limit value of the time series data. The lower limit ratio shows a ratio of a difference between a lower-side threshold value of the time series data and the lower limit value of the time series data to the lower limit value of the time series data in percentage. For example, a field of a part "temperature sensor" of the sampling period definition table 16c shown in FIG. 5C stores 60 degrees Celsius as the upper limit value, 90% as the upper limit ratio, 15 degrees Celsius as the lower limit value, and 20% as the lower limit ratio. In this case, an upper-side threshold value of the time series data is 60×90/100=54 degrees Celsius, and a lower-side threshold value is 15×(100+20)/100=18 degrees Celsius.

In FIG. 11, the sampling period control section 18 determines first whether the value of the time series data SQ3 exceeds a threshold value, goes to step S132 if Yes, and goes to step S135 if No (step S131). In step S131, the sampling period control section 18 reads the upper limit value, the upper limit ratio, the lower limit value, and the lower limit ratio corresponding to the kind of the time series data SQ3 from the sampling period definition table 16c, goes to step S132 if the value of the time series data SQ3 exceeds (upper limit value×upper limit ratio) or the value of the time series data SQ3 is smaller than {lower limit value×(1+lower limit ratio)}, and goes to step S135 otherwise.

If Yes in step S131, the sampling period control section 18 determines whether the sampling period used when obtaining the time series data SQ3 is the normal period, and goes to step S133 if Yes (step S132). In this case, the sampling period control section 18 controls the sampling period used when obtaining the time series data SQ3 to the abnormal period (step S133). In step S133, the sampling period control section 18 reads the abnormal period corresponding to the kind of the time series data SQ3 from the sampling period definition table 16c, and sets the sampling period used when obtaining the time series data SQ3 from next time onwards to the read abnormal period. Next, the sampling period control section 18 controls another sampling period to the abnormal period with reference to the factor relation table 17 if necessary, as with step S114 shown in FIG. 8 (step S134).

If No in step S131, the sampling period control section 18 determines whether the sampling period used when obtaining the time series data SQ3 is the abnormal period, and goes to step S136 if Yes (step S135). In this case, the sampling period control section 18 determines whether to perform the automatic return, goes to step S138 if Yes, and goes to step S137 if No (step S136). In step S136, the sampling period control section 18 reads the automatic return flag corresponding to the kind of the time series data SQ3 from the sampling period definition table 16c, goes to step S138 if the automatic return flag is TRUE, and goes to step S137 otherwise.

If No in step S136, the sampling period control section 18 determines whether the return instruction is input, and goes to step S138 if Yes (step S137). If the sampling period used when obtaining the time series data SQ3 is controlled to the abnormal period, the user inputs the return instruction using the instruction input section 15 after exchanging or adjusting the part corresponding to the time series data SQ3. In step S137, if the return instruction has already been input, the sampling period control section 18 goes to step S138.

If Yes in step S136 or S137, the sampling period control section 18 controls the sampling period used when obtaining the time series data SQ3 to the normal period (step S138). In step S138, the sampling period control section 18 reads the normal period corresponding to the kind of the time series data SQ3 from the sampling period definition table 16c, and sets the sampling period used when obtaining the time series data SQ3 from next time onwards to the read normal period. Next, the sampling period control section 18 controls another sampling period to the normal period with reference to the factor relation table 17 if necessary, as with step S119 shown in FIG. 8 (step S139). The sampling period control section 18 finishes step S130 after executing step S134 or S139 or after determining No in step S132, S135, or S137.

A field of a part "PLC battery" of the sampling period definition table 16c shown in FIG. 5C stores 300 mV as the lower limit value, 50% as the lower limit ratio, 5,000 msec as the normal period, and 500 msec as the abnormal period. Note that PLC is an abbreviation of a programmable controller. The sampling period used when obtaining the time series data is controlled to 5,000 msec in step S101. The lower-side threshold value of the time series data is 300×(100+50)/100=450. Therefore, when a PLC battery value becomes smaller than 450 mV, the sampling period used when obtaining the time series data is set to 500 msec.

FIG. 12 is a flowchart showing details of a sampling period control based on a variation in the time series data. The sampling period definition table 16d shown in FIG. 5D stores a standard deviation, the normal period, the abnormal period, and the automatic return flag corresponding to the kind of the time series data. The standard deviation shows an acceptable value of the variation in the time series data. The sampling period control section 18 performs processing shown in FIG. 12 on the time series data 7 with respect to which magnitude relation between the variation and the acceptable value changes (time series data of which variation changes from "not exceed acceptable value" to "exceeds acceptable value", or oppositely). Hereinafter, the time series data processed in step S140 is referred to as SQ4.

In FIG. 12, the sampling period control section 18 determines first whether the variation in the time series data SQ4 exceeds the acceptable value, goes to step S142 if Yes, and goes to step S145 if No (step S141). In step S141, the sampling period control section 18 reads the standard deviation corresponding to the kind of the time series data SQ4 from the sampling period definition table 16d, goes to step S142 if the variation in the time series data SQ4 exceeds the standard deviation, and goes to step S145 otherwise.

If Yes in step S141, the sampling period control section 18 determines whether the sampling period used when obtaining the time series data SQ4 is the normal period, and goes to step S143 if Yes (step S142). In this case, the sampling period control section 18 controls the sampling period used when obtaining the time series data SQ4 to the abnormal period (step S143). In step S143, the sampling period control section 18 reads the abnormal period corresponding to the kind of the time series data SQ4 from the sampling period definition table 16d, and sets the sampling period used when obtaining the time series data SQ4 from next time onwards to the read abnormal period. Next, the sampling period control section 18 controls another sampling period to the abnormal period with reference to the factor relation table 17 if necessary, as with step S114 shown in FIG. 8 (step S144).

If No in step S141, the sampling period control section 18 determines whether the sampling period used when obtaining the time series data SQ4 is the abnormal period, and goes to step S146 if Yes (step S145). In this case, the sampling period control section 18 determines whether to perform the automatic return, goes to step S148 if Yes, and goes to step S147 if No (step S146). In step S146, the sampling period control section 18 reads the automatic return flag corresponding to the kind of the time series data SQ4 from the sampling period definition table 16d, goes to step S148 if the automatic return flag is TRUE, and goes to step S147 otherwise.

If No in step S146, the sampling period control section 18 determines whether the return instruction is input, and goes to step S148 if Yes (step S147). If the sampling period used when obtaining the time series data SQ4 is controlled to the abnormal period, the user inputs the return instruction using the instruction input section 15 after performing an operation for setting the variation in the time series data 7 within the acceptable value. In step S147, if the return instruction has already been input, the sampling period control section 18 goes to step S148.

If Yes in step S146 or S147, the sampling period control section 18 controls the sampling period used when obtaining the time series data SQ4 to the normal period (step S148). In step S148, the sampling period control section 18 reads the normal period corresponding to the kind of the time series data SQ4 from the sampling period definition table 16d, and sets the sampling period used when obtaining the time series data SQ4 from next time onwards to the read normal period. Next, the sampling period control section 18 controls another sampling period to the normal period with reference to the factor relation table 17 if necessary, as with step S119 shown in FIG. 8 (step S149). The sampling period control section 18 finishes step S140 after executing step S144 or S149 or after determining No in step S142, S145, or S147.

In the flowcharts shown above, steps S102 and S103 executed by the sampling section 11 correspond to a sampling step. Step S105 executed by the score calculation section corresponds to an evaluation value calculation step. Steps S101, S110, S120, S130, and S140 executed by the sampling period control section 18 correspond to a sampling period control step.

Figure 13A:
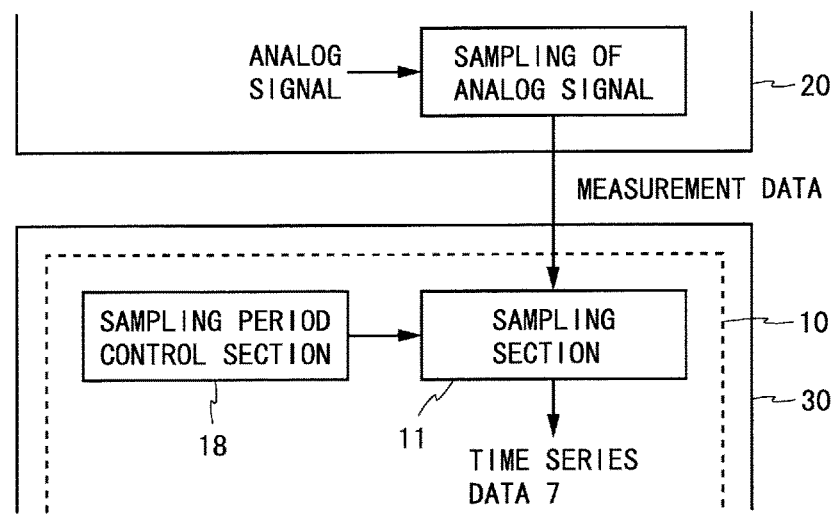
FIG. 13A is a diagram showing a first example of an implementation style of the data processing device shown in FIG. 1.
Figure 13B:
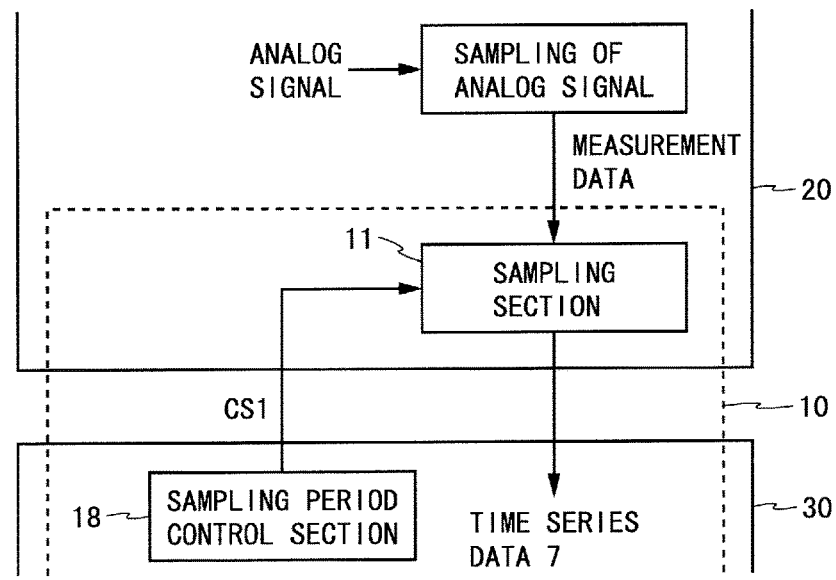
FIG. 13B is a diagram showing a second example of the implementation style of the data processing device shown in FIG. 1.
Figure 13C:
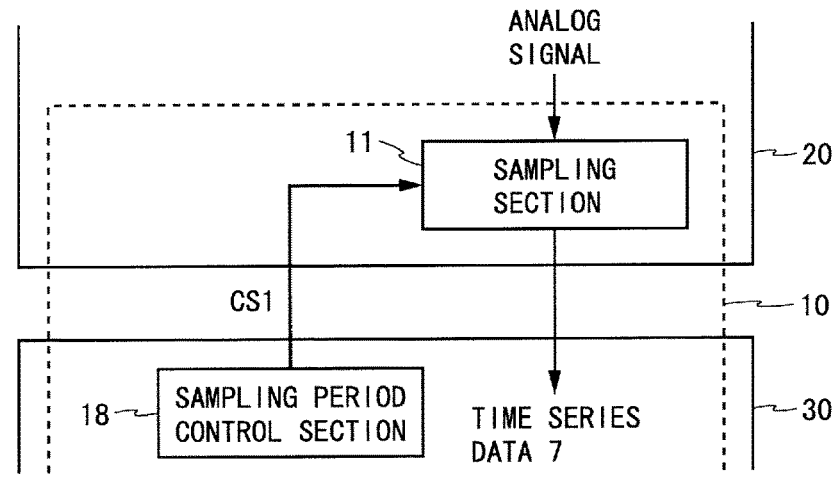
FIG. 13C is a diagram showing a third example of the implementation style of the data processing device shown in FIG. 1.

FIGS. 13A to 13C are diagrams showing first to third examples of an implementation style of the data processing device 10, respectively. In the first to third examples, the computer 30 is provided outside of the substrate processing apparatus 20, and all or a part of the data processing device 10 is realized by the computer 30 executing the data processing program 41 using the CPU 31.

The first example shown in FIG. 13A is same as that described in FIG. 1. In the first example, the computer 30 provided outside of the substrate processing apparatus 20 functions as the data processing device 10. In the substrate processing apparatus 20, sampling of an analog signal (sampling and quantization of analog signal) is performed using a fixed sampling period. Irrespective of the sampling period used in the sampling section 11, a same amount of measurement data is output from the substrate processing apparatus 20 to the computer 30. The sampling section 11 realized by the computer 30 obtains the time series data 7 by extracting data from the measurement data which is output from the substrate processing apparatus 20, using the sampling period controlled by the sampling period control section 18.

In the second example shown in FIG. 13B, the sampling section 11 in the data processing device 10 is included in the substrate processing apparatus 20, and other portions are realized by the computer 30. An analog signal is sampled using a fixed sampling period in the substrate processing apparatus 20. The sampling period control section 18 outputs a control signal CS1 showing the sampling period used when obtaining the time series data 7, to the sampling section 11 in the substrate processing apparatus 20. The sampling section 11 obtains the time series data 7 by extracting data from the measurement data measured in the substrate processing apparatus 20, using the sampling period shown by the control signal CS1. The time series data 7 obtained in the sampling section 11 is output to the computer 30. The time series data 7 having an amount depending on the sampling period used in the sampling section 11 is output from the substrate processing apparatus 20 to the computer 30.

In the third example shown in FIG. 13C, the sampling section 11 in the data processing device 10 is included in the substrate processing apparatus 20, and other portions are realized by the computer 30. The sampling period control section 18 outputs the control signal CS1 showing the sampling period used when obtaining the time series data 7, to the sampling section 11 included in the substrate processing apparatus 20. The sampling section 11 obtains the time series data 7 by sampling an analog signal (sampling and quantization of analog signal) using the sampling period shown by the control signal CS1 in the substrate processing apparatus 20. The time series data 7 obtained in the sampling section 11 is output to the computer 30. The time series data 7 having an amount depending on the sampling period used in the sampling section 11 is output from the substrate processing apparatus 20 to the computer 30.

In any of the first to third examples, the sampling section 11 obtains the time series data 7 based on the measurement result of the physical quantity in the substrate processing apparatus 20. The data processing device 10 may be implemented in any style of the first to third examples.

The data processing method according to the present embodiment includes a sampling step (S102, S103) of obtaining the time series data 7 based on the measurement result of the physical quantity in the substrate processing apparatus 20, an evaluation value calculation step (S105) of obtaining an evaluation value (score) of the time series data 7 by comparing the time series data 7 with the reference data 8, and a sampling period control step (S101, S110, S120, S130, S140) of controlling the sampling period used in the sampling step for each time series data 7. In the sampling period control step, all sampling periods used in the sampling step are controlled to the normal period in the initial state (S101), and when the evaluation value of the time series data 7 is abnormal, the sampling period used when obtaining the time series data 7 is controlled to the abnormal period shorter than the normal period (S113). In this manner, when the evaluation value obtained by comparing the time series data 7 with the reference data 8 is abnormal, the sampling period used when obtaining the time series data 7 is shortened. With this, the sampling period can be switched at a suitable timing for each time series data 7, and detailed data can be obtained before an abnormality occurs in the substrate processing apparatus 20.

In the sampling period control step, when an alarm occurs in the substrate processing apparatus 20, the sampling period used when obtaining the time series data 7 associated to the alarm is controlled to the abnormal period (S123). Therefore, when the alarm occurs in the substrate processing apparatus 20, the sampling period used when obtaining the time series data 7 associated to the occurring alarm can be shortened and the detailed data can be obtained. In the sampling period control step, when a value of the time series data 7 exceeds a predetermined threshold value or when a variation in the time series data 7 exceeds a predetermined acceptable value, the sampling period used when obtaining the time series data 7 is controlled to the abnormal period (S133, S143). Therefore, when the value of the time series data 7 exceeds the threshold value as an omen of a failure of the substrate processing apparatus 20 or when the variation in the time series data 7 exceeds the acceptable value, the sampling period used when obtaining the time series data 7 can be shortened and the detailed data can be obtained.

In the sampling period control step, when the sampling period used when obtaining the time series data 7 is controlled to the abnormal period, the sampling period used when obtaining another time series data associated to the time series data 7 is controlled to the abnormal period (S114, S124, S134, S144). Therefore, detailed data with respect to a plurality of pieces of mutually related time series data 7 can be obtained together. In the sampling period control step, the sampling period used when obtaining the other time series data is controlled to the abnormal period using the factor relation table 17 storing the kinds of time series data 7 in a mutually associated manner. Therefore, the sampling period used when obtaining the other time series data can be controlled easily.

In the sampling period control step, the sampling period used when obtaining the time series data 7 is controlled using the sampling period definition table 16 storing the normal period and the abnormal period in association with the kind of time series data 7. Therefore, the sampling period used when obtaining the time series data 7 can be controlled easily. The sampling period definition table 16 stores the automatic return flag in association with the kind of time series data 7, and in the sampling period control step, the sampling period used when obtaining the time series data 7 is controlled to the normal period, when a cause for which the sampling period used when obtaining the time series data 7 is controlled to the abnormal period is solved and the automatic return flag corresponding to the time series data 7 stored in the sampling period definition table 16 is valid (S118, S128, S138, S148). Therefore, the sampling period used when obtaining the time series data 7 can be automatically controlled to the normal period depending on characteristics of the time series data 7.

In the sampling step, the time series data 7 may be obtained by extracting data from the measurement data measured in the substrate processing apparatus 20, using the sampling period controlled in the sampling period control step. Furthermore, an evaluation value suitable for the time series data 7 can be obtained by using another time series data as the reference data 8.

The data processing device 10 and the data processing program 41 according to the present embodiment have features similar to those of the above-described data processing method, and attain similar effects. According to the data processing method, the data processing device 10, and the data processing program 41 according to the present embodiment, the sampling period can be switched at a suitable timing for each time series data, and detailed data can be obtained before an abnormality occurs in the substrate processing apparatus 20.

Note that in the above-described data processing method, in addition to steps S101 and S110, steps S120, S130, and S140 are executed in the sampling period control step. However, it is not necessary to execute all of steps S120, S130, and S140 in the sampling period control step. In the data processing method according to a modification, none of steps S120, S130, and S140 may be executed or any of selected arbitrarily from steps S120, S130, and S140 is/are executed in the sampling period control step. The same holds true for a data processing device and a data processing program according to a modification.

Although the present invention is described in detail in the above, the above description is exemplary in all of the aspects and is not restrictive. It is understood that various other changes and modifications can be derived without going out of the present invention.

This application claims a priority based on Japanese Patent Application No. 2018-20797 filed on Feb. 8, 2018, and entitled "Data Processing Method, Data Processing Device, And Data Processing Program", which is incorporated herein by reference in its entirety.

What is claimed is:

1. A data processing method comprising:
    a sampling step of obtaining time series data based on a measurement result of a physical quantity in a substrate processing apparatus;
    an evaluation value calculation step of obtaining an evaluation value of the time series data by comparing the time series data with reference data; and
    a sampling period control step of controlling a sampling period used in the sampling step for each time series data, the sampling period being a period for extracting one piece of data constituting the time series data, wherein
    in the sampling period control step, all sampling periods used in the sampling step are controlled to a normal period in an initial state, and when the evaluation value of the time series data is abnormal, the sampling period used when obtaining the time series data is controlled to an abnormal period shorter than the normal period.

2. The data processing method according to claim 1, wherein in the sampling period control step, when an alarm occurs in the substrate processing apparatus, the sampling period used when obtaining the time series data associated to the alarm is controlled to the abnormal period.

3. The data processing method according to claim 1, wherein in the sampling period control step, when a value of the time series data exceeds a predetermined threshold value, the sampling period used when obtaining the time series data is controlled to the abnormal period.

4. The data processing method according to claim 1, wherein in the sampling period control step, when a variation in the time series data exceeds a predetermined acceptable value, the sampling period used when obtaining the time series data is controlled to the abnormal period.

5. The data processing method according to claim 1, wherein in the sampling period control step, when the sampling period used when obtaining the time series data is controlled to the abnormal period, a sampling period used when obtaining another time series data associated to the time series data is controlled to the abnormal period.

6. The data processing method according to claim 5, wherein in the sampling period control step, the sampling period used when obtaining the other time series data is controlled to the abnormal period using a factor relation table storing kinds of the time series data in a mutually associated manner.

7. The data processing method according to claim 1, wherein in the sampling period control step, the sampling period used when obtaining the time series data is controlled using a sampling period definition table storing the normal period and the abnormal period in association with a kind of the time series data.

8. The data processing method according to claim 7, wherein
    the sampling period definition table further stores an automatic return flag in association with the kind of the time series data, and
    in the sampling period control step, the sampling period used when obtaining the time series data is controlled to the normal period, when a cause for which the sampling period used when obtaining the time series data is controlled to the abnormal period is solved and the automatic return flag corresponding to the time series data stored in the sampling period definition table is valid.

9. The data processing method according to claim 1, wherein in the sampling step, the time series data is obtained by extracting data from measurement data obtained in the substrate processing apparatus, using the sampling period controlled in the sampling period control step.

10. The data processing method according to claim 1, wherein the reference data is another time series data.

11. A data processing device comprising:
    a sampling section configured to obtain time series data based on a measurement result of a physical quantity in a substrate processing apparatus;

an evaluation value calculation section configured to obtain an evaluation value of the time series data by comparing the time series data with reference data; and a sampling period control section configured to control a sampling period used in the sampling section for each time series data, the sampling period being a period for extracting one piece of data constituting the time series data, wherein the sampling period control section controls all sampling periods used in the sampling section to a normal period in an initial state, and when the evaluation value of the time series data is abnormal, the sampling period control section controls the sampling period used when obtaining the time series data to an abnormal period shorter than the normal period.

12. The data processing device according to claim 11, wherein when an alarm occurs in the substrate processing apparatus, the sampling period control section controls the sampling period used when obtaining the time series data associated to the alarm to the abnormal period.

13. The data processing device according to claim 11, wherein when a value of the time series data exceeds a predetermined threshold value, the sampling period control section controls the sampling period used when obtaining the time series data to the abnormal period.

14. The data processing device according to claim 11, wherein when a variation in the time series data exceeds a predetermined acceptable value, the sampling period control section controls the sampling period used when obtaining the time series data to the abnormal period.

15. The data processing device according to claim 11, wherein when controlling the sampling period used when obtaining the time series data to the abnormal period, the sampling period control section controls a sampling period used when obtaining another time series data associated to the time series data to the abnormal period.

16. The data processing device according to claim 15, further comprising a factor relation table storing kinds of the time series data in a mutually associated manner, wherein
the sampling period control section controls the sampling period used when obtaining the other time series data to the abnormal period using the factor relation table.

17. The data processing device according to claim 11, further comprising a sampling period definition table storing the normal period and the abnormal period in association with a kind of the time series data, wherein
the sampling period control section controls the sampling period used when obtaining the time series data using the sampling period definition table.

18. The data processing device according to claim 17, wherein
the sampling period definition table further stores an automatic return flag in association with the kind of the time series data, and
the sampling period control section controls the sampling period used when obtaining the time series data to the normal period, when a cause for which the sampling period used when obtaining the time series data is controlled to the abnormal period is solved and the automatic return flag corresponding to the time series data stored in the sampling period definition table is valid.

19. The data processing device according to claim 11, wherein the sampling section obtains the time series data by extracting data from measurement data measured in the substrate processing apparatus, using the sampling period controlled by the sampling period control section.

20. A non-transitory computer-readable recording medium having recorded thereon a data processing program, the data processing program causing a computer to execute a method by a CPU using a memory, the method comprising:
a sampling step of obtaining time series data based on a measurement result of a physical quantity in a substrate processing apparatus;
an evaluation value calculation step of obtaining an evaluation value of the time series data by comparing the time series data with reference data; and
a sampling period control step of controlling a sampling period used in the sampling step for each time series data, the sampling period being a period for extracting one piece of data constituting the time series data, wherein
in the sampling period control step, all sampling periods used in the sampling step are controlled to a normal period in an initial state, and when the evaluation value of the time series data is abnormal, the sampling period used when obtaining the time series data is controlled to an abnormal period shorter than the normal period.

* * * * *